United States Patent
Kellis et al.

(10) Patent No.: US 8,094,426 B2
(45) Date of Patent: Jan. 10, 2012

(54) ELECTRICAL SWITCHING APPARATUS PROVIDING COORDINATED OPENING WITH A CIRCUIT INTERRUPTER AND METHOD OF OPERATING THE SAME

(75) Inventors: Joe M. Kellis, Weaverville, NC (US); Lawrence B. Farr, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 415 days.

(21) Appl. No.: 12/476,451

(22) Filed: Jun. 2, 2009

(65) Prior Publication Data

US 2010/0302700 A1 Dec. 2, 2010

(51) Int. Cl.
*H02H 3/00* (2006.01)

(52) U.S. Cl. ............................................ 361/109; 361/3

(58) Field of Classification Search ................. 361/3, 42, 361/109

See application file for complete search history.

(56) References Cited

U.S. PATENT DOCUMENTS

| | | | |
|---|---|---|---|
| 4,247,745 A | 1/1981 | Wilson | |
| 4,479,042 A | 10/1984 | Basnett | |
| 4,485,366 A | 11/1984 | Basnett | |
| 4,504,808 A | 3/1985 | Basnett | |
| 4,544,817 A | 10/1985 | Basnett | |
| 4,559,511 A | 12/1985 | Basnett et al. | |
| 4,922,363 A * | 5/1990 | Long et al. | 361/3 |
| 5,559,426 A | 9/1996 | Shea et al. | |
| 2005/0122654 A1* | 6/2005 | Culligan et al. | 361/93.1 |
| 2010/0238596 A1* | 9/2010 | Wittner | 361/42 |

* cited by examiner

*Primary Examiner* — Danny Nguyen
(74) *Attorney, Agent, or Firm* — Martin J Moran

(57) ABSTRACT

An electrical switching apparatus includes a number of separable contacts, an operating mechanism structured to open and close the separable contacts, a number of sensors structured to sense at least current flowing through the separable contacts, and a processor structured to cooperate with the operating mechanism to open and close the separable contacts. The processor determines a fault from the sensed current flowing through the separable contacts. The processor further responsively opens the separable contacts if the sensed current associated with the fault is less than the interrupting rating of the electrical switching apparatus. The processor keeps the separable contacts closed and waits for another circuit interrupter to interrupt the fault if the sensed current associated with the fault is greater than the interrupting rating.

23 Claims, 2 Drawing Sheets

ELECTRICAL SWITCHING APPARATUS PROVIDING COORDINATED OPENING WITH A CIRCUIT INTERRUPTER AND METHOD OF OPERATING THE SAME

BACKGROUND

1. Field

The disclosed concept pertains generally to electrical switching apparatus and, more particularly, to contactors. The disclosed concept also relates to a method of operating electrical switching apparatus.

2. Background Information

Contactors are employed, for example and without limitation, in starter applications to switch on/off a load as well as to protect a load, such as a motor or other electrical device, from current overloads. Contactors are used as electrical switching apparatus and incorporate fixed and movable contacts that when closed, conduct electric power.

For example, three-pole, low voltage contactors have three contact assemblies, one contact assembly for each phase or pole of a three-phase electrical device. Each contact assembly can include, for example, a pair of stationary contacts and a moveable contact. One stationary contact is a line side contact and the other stationary contact is a load side contact. The moveable contact is controlled by an actuating assembly comprising an armature and magnet assembly, which is energized by a coil to move the moveable contact to form a bridge between the stationary contacts. When the moveable contact is engaged with both stationary contacts, current is allowed to travel from the power source or line to the load or electrical device. When the moveable contact is separated from the stationary contacts, an open circuit is created and the line and load are electrically isolated from one another.

Generally, a single coil is used to operate a common carrier for all three contact assemblies. As a result, the low voltage contactor is constructed such that whenever a fault condition or switch open command is received in any one pole or phase of the three-phase input, all the contact assemblies of the contactor are opened in unison. Simply, the contact assemblies are controlled as a group as opposed to being independently controlled.

Medium voltage contactors generally include air gap, insulating gas and vacuum varieties. For example, vacuum contactors interrupt an electrical arc within a vacuum.

A single-phase vacuum contactor, for example, includes a vacuum bottle having a suitable highly evacuated vacuum maintained therein, an operating mechanism, an alternating current (AC) power line terminal and a load terminal. For example, a fixed contact and a movable contact are contained within the vacuum bottle and are electrically connected to the line terminal and a movable bottle stem, respectively. The load terminal of the contactor is electrically connected by a shunt to the bottle stem which protrudes from the bottle. Movement of the bottle stem away from the bottle moves the movable contact away from the fixed contact and, thus, separates the contacts in an open position. The operating mechanism includes, for example, a T-shaped crossbar which is rotatable about a bearing, and a coil having an armature which is responsive to the coil and attached to the crossbar in order to rotate the crossbar. The T-shaped crossbar has a kickout arm and a pivot plate arm.

Examples of medium voltage or vacuum contactors including a number of poles are disclosed in U.S. Pat. Nos. 5,559,426; 4,559,511; 4,544,817; 4,504,808; 4,485,366; 4,479,042; and 4,247,745.

Known contactors employ a fixed opening time that is coordinated with main starter power fuses to ensure that the contactor does not interrupt a fault that is greater than its interrupting rating. For example, the opening time of a typical contactor is in the order of about 8 line cycles or about 130 milliseconds. The contactor waits this amount of time to open even if the fault current is below the contactor's interrupting rating.

As another example, some known contactors made by different manufacturers have interrupting capabilities of between 4400 amperes and 8500 amperes and employ a fixed or predetermined drop out time of between 2 and 20 line cycles.

There is room for improvement in electrical switching apparatus, such as contactors.

There is also room for improvement in methods of operating electrical switching apparatus.

SUMMARY

These needs and others are met by embodiments of the disclosed concept, which provide an electrical switching apparatus, such as a contactor, that decides to either responsively open separable contacts (e.g., immediately or as quickly as possible), or hold the separable contacts closed and wait for another circuit interrupter (e.g., without limitation, a fuse) to clear a fault based on the fault current flowing through the contactor. The reduced time for the contactor to clear the fault when the fault current is less than the interrupting rating of the contactor results in less damage to other system components (e.g., without limitation, power cables; a motor). This shorter clearing time also provides more margin for coordination with upstream devices.

In accordance with one aspect of the disclosed concept, an electrical switching apparatus includes an interrupting rating and comprises: a number of separable contacts; an operating mechanism structured to open and close the separable contacts; a number of sensors structured to sense at least current flowing through the separable contacts; and a processor structured to cooperate with the operating mechanism to open and close the separable contacts, and to determine a fault from the sensed current flowing through the separable contacts, wherein the processor is further structured to responsively open the separable contacts if the sensed current associated with the fault is less than the interrupting rating, and wherein the processor is further structured to keep the separable contacts closed and wait for another circuit interrupter to interrupt the fault if the sensed current associated with the fault is greater than the interrupting rating.

The operating mechanism may comprise a control circuit and a coil; and the processor and the control circuit may be structured to cause an immediate depletion of the back electromotive force of the coil to reduce opening time of the separable contacts.

The number of sensors may be a number of voltage sensors structured to sense voltage operatively associated with the separable contacts and a number of current sensors structured to sense the current flowing through the separable contacts; the electrical switching apparatus may be a motor starter for a motor; and the processor may further be structured, when starting the motor, to input from the current sensors and the voltage sensors line voltage and line current for a number of line cycles during the starting.

The processor may be further structured to calculate:

$V_d = (V_b - V_s)/V_b$, and $I_{sc} = I_s/V_d$;

wherein $V_d$ is per unit voltage drop, $V_b$ is the line voltage before the starting, $V_s$ is the line voltage during the starting, $I_{sc}$ is available short circuit current, and $I_s$ is the line current during the starting.

The processor may be further structured to determine if the available short circuit current, $I_{sc}$, is less than the interrupting rating, which is a short-circuit breaking capacity of the electrical switching apparatus, and responsively open the separable contacts; and the processor may be further structured to delay opening the separable contacts if the available short circuit current, $I_{sc}$, is greater than the short-circuit breaking capacity.

The processor may be further structured to determine if the fault current flowing through the separable contacts is less than the short-circuit breaking capacity and responsively open the separable contacts.

The processor may be further structured to open the separable contacts after the fault current has been interrupted by such another circuit interrupter if the available short circuit current, $I_{sc}$, is greater than the short-circuit breaking capacity.

The processor may be further structured to determine if a fault current flowing through the separable contacts is less than an instantaneous trip setting and responsively execute an overload trip algorithm; and the processor may be further structured to wait for one of a predetermined start delay or a predetermined run delay if the fault current flowing through the separable contacts is greater than the instantaneous trip setting.

The processor may be further structured to use the predetermined start delay after the motor has been started and the line current is about 450% to about 700% of a full load current until the line current drops to the full load current.

The processor may be further structured to determine if a fault current flowing through the separable contacts is less than an instantaneous trip setting and responsively execute an overload trip algorithm; and the processor may be further structured to delay opening the separable contacts until the fault current is zero if: (a) the fault current flowing through the separable contacts is greater than the instantaneous trip setting, (b) the available short circuit current, $I_{sc}$, is greater than the interrupting rating, and (c) the fault current flowing through the separable contacts is greater than the interrupting rating.

The operating mechanism may comprise a coil and a control circuit for driving the coil; the control circuit may comprise a capacitor, a switch and a pulse width modulated driver for driving the switch; when the switch is turned on by the pulse width modulated driver, the diode may be reverse biased and does not conduct; when the switch is turned off by the pulse width modulated driver, the back electromotive force of the coil may cause the diode to be forward biased and conduct a circulating current through the coil until the switch starts to conduct again; and the circulating current may keep the separable contacts closed until the switch starts to conduct again.

The switch may be a first switch; the control circuit may further comprise a second switch electrically connected in series with the first switch and a transorb electrically connected in parallel with the coil; and the processor may be further structured to open the separable contacts by causing the second switch to turn off, in order that the back electromotive force of the coil causes the transorb to start conducting at a predetermined voltage, which causes the separable contacts to open after a predetermined time.

The number of sensors may be a number of voltage sensors structured to sense voltage operatively associated with the separable contacts and a number of current sensors structured to sense the current flowing through the separable contacts; the processor may be further structured to input from the current sensors and the voltage sensors line voltage and line current, calculate therefrom available short circuit current and determine if the electrical switching apparatus should open the separable contacts to interrupt a fault or allow such another circuit interrupter to interrupt the fault.

As another aspect of the disclosed concept, a method of operating an electrical switching apparatus including an interrupting rating comprises: employing a number of separable contacts; sensing current flowing through the separable contacts; determining a fault from the sensed current flowing through the separable contacts; determining if the sensed current associated with the fault is less than the interrupting rating, and responsively opening the separable contacts; and determining if the sensed current associated with the fault is greater than the interrupting rating, and responsively keeping the separable contacts closed and waiting for another circuit interrupter to interrupt the fault.

The method may further comprise sensing voltage operatively associated with the separable contacts; determining an available short circuit current from the sensed voltage and the sensed current; determining if the available short circuit current is less than the interrupting rating, which is a short-circuit breaking capacity of the electrical switching apparatus, and responsively opening the separable contacts; and determining if the available short circuit current is greater than the short-circuit breaking capacity and delaying opening the separable contacts.

The method may further comprise determining if a fault current flowing through the separable contacts is less than the short-circuit breaking capacity and responsively opening the separable contacts.

As another aspect of the disclosed concept, a contactor includes an interrupting rating and comprises: a number of separable contacts; an operating mechanism structured to open and close the separable contacts; a number of current sensors structured to sense current flowing through the separable contacts; a number of voltage sensors structured to sense voltage operatively associated with the separable contacts; and a processor structured to cooperate with the operating mechanism to open and close the separable contacts, and to determine a fault from the sensed current flowing through the separable contacts, wherein the processor is further structured, before starting a load, to input from the voltage sensors line voltage, $V_b$, before the starting, wherein the processor is further structured, after starting the load, to input from the voltage sensors and the current sensors line voltage, $V_s$, and line current, $I_s$, respectively, for a number of line cycles during the starting, wherein the processor is further structured to calculate:

$$V_d = (V_b - V_s)/V_b, \text{ and}$$

$$I_{sc} = I_s/V_d,$$

wherein $V_d$ is per unit voltage drop, and $I_{sc}$ is available short circuit current, wherein the processor is further structured to determine if the available short circuit current, $I_{sc}$, is less than the interrupting rating and responsively open the separable contacts, and wherein the processor is further structured to delay opening the separable contacts and wait for another circuit interrupter to interrupt the fault if the available short circuit current, $I_{sc}$, is greater than the interrupting rating.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the terms "responsively open" or "responsively opening" mean that a processor, responsive to a condition (e.g., without limitation, a sensed current associated with a fault being less than an interrupting rating), causes separable contacts to open either immediately or as quickly as possible without waiting for another circuit interrupter to interrupt the power circuit which is in series with such separable contacts.

The disclosed concept is described in association with a three-pole medium voltage contactor, although the disclosed concept is applicable to a wide range of electrical switching apparatus, such as, for example and without limitation, contactors, motor starters or circuit breakers, having any number of poles.

Figure 1:
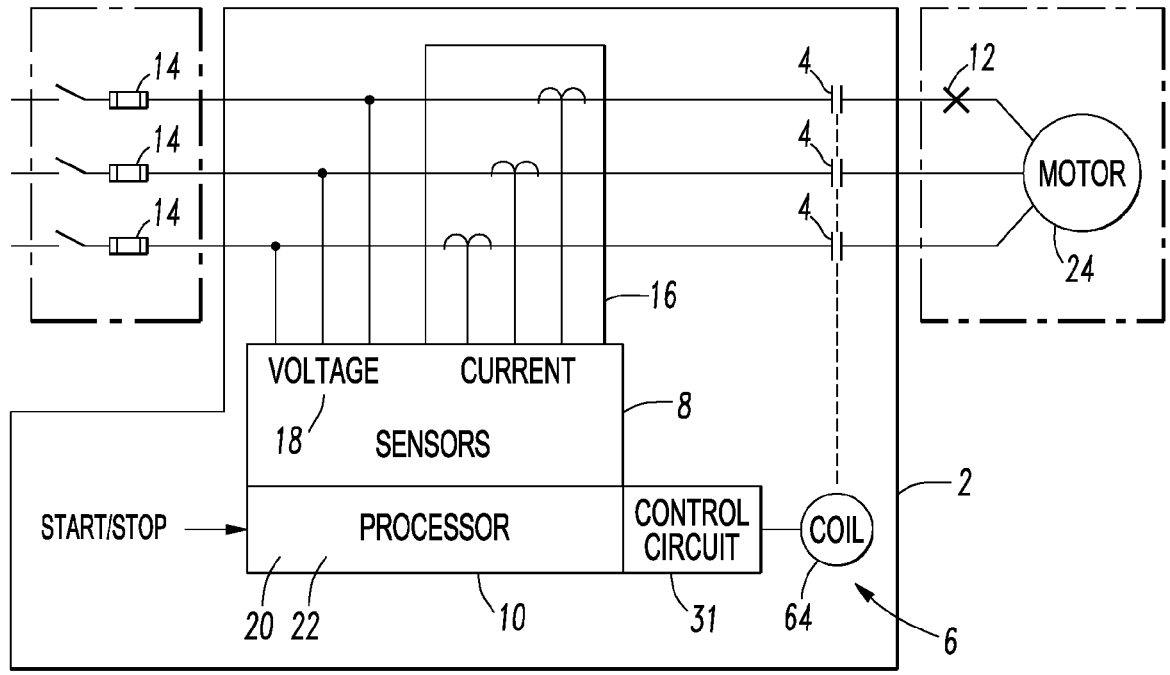
FIG. 1 is a block diagram in schematic form of a contactor in accordance with embodiments of the disclosed concept.

Referring to FIG. 1, an electrical switching apparatus, such as the example three-pole contactor 2, is shown. The example contactor 2 includes a number (e.g., without limitation, three are shown) of separable contacts 4, an operating mechanism 6 structured to open and close the separable contacts 4, a number of sensors 8 structured to sense at least current flowing through the separable contacts 4, and a processor 10 structured to cooperate with the operating mechanism 6 to open and close the separable contacts 4. As is conventional, the processor 10 is further structured to determine a fault 12 (e.g., without limitation, a single-phase line-to-ground fault; a single-phase line-to-line fault; a three-phase line-to-line fault; a line-to-line and ground fault) from the sensed current flowing through the separable contacts 4. As will be discussed in greater detail, below, the processor 10 is further structured to responsively open the separable contacts 4 if the sensed current associated with the fault 12 is less than the interrupting rating of the contactor 2, and to keep the separable contacts 4 closed and wait for another circuit interrupter, such as a number of the example power fuses 14, to interrupt the fault 12 if the sensed current associated with the fault 12 is greater than the contactor interrupting rating.

Example 1

In this example, the contactor 2 is a three-pole medium voltage contactor 2, which includes three current sensors 16 (e.g., without limitation, current transformers; Rogowski coils), three voltage sensors 18 to sense the line voltage operatively associated with the separable contacts 4, and a processor-based control and protection module 20. The processor 10 knows the contactor interrupting rating. When a fault, such as 12, occurs, the processor 10 compares the fault current level with the contactor interrupting rating. If the fault current is greater than the contactor interrupting rating, then the processor 10 holds the contactor 2 closed until an upstream circuit interrupter (e.g., without limitation, a number of the power fuses 14) clears the fault 12. If the fault current is less than the contactor interrupting rating, then the processor 10 responsively opens the contactor separable contacts 4.

Example 2

Figure 2:
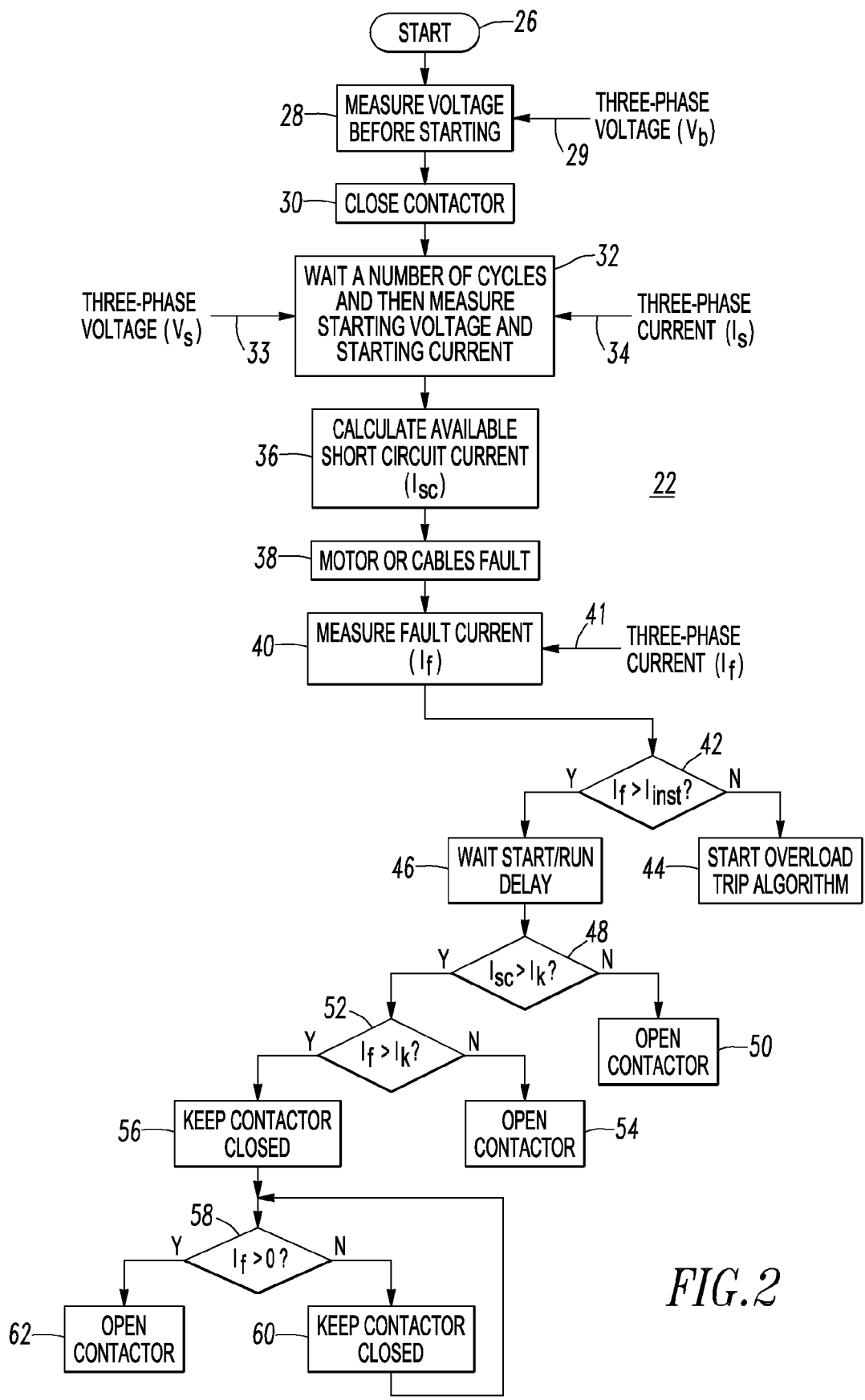
FIG. 2 is a flowchart of a routine for the processor of FIG. 1.

FIG. 2 shows a routine 22 for the processor 10 of FIG. 1. As will be discussed, the processor routine 22 determines if the available short circuit current, $I_{sc}$, is less than the contactor interrupting rating ($I_k$), and responsively opens the separable contacts 4. Otherwise, the processor routine 22 delays opening the separable contacts 4 if the available short circuit current, $I_{sc}$, is greater than the contactor interrupting rating.

For each start of the motor 24 (shown in phantom line drawing in FIG. 1), the line voltage (e.g., without limitation, $V_s$) and the line current (e.g., without limitation, $I_s$) are sensed by the respective voltage and current sensors 18 and 16. Preferably, the readings are taken a number of cycles (e.g., without limitation, 10) into starting to eliminate the disturbances typically seen on contactor closing. The voltage drop ($V_d$ (per unit)) and the starting line current ($I_s$) are used to calculate the available short circuit current ($I_{sc}$) as shown by Equations 1 and 2, respectively.

$$V_d = (V_b - V_s)/V_b \quad \text{(Eq. 1)}$$

wherein:
 $V_d$ is voltage drop (per unit);
 $V_b$ is line voltage before starting (volts); and
 $V_s$ is line voltage during starting (volts).

$$I_{sc} = I_s/V_d \quad \text{(Eq. 2)}$$

wherein:
 $I_{sc}$ is available short circuit current (amperes); and
 $I_s$ is line current during starting (amperes).

Continuing to refer to FIG. 2, at 26, the routine 22 starts. Next, at 28, the routine 22 measures $V_b$ 29, the line voltage before starting, after which, at 30, the contactor separable contacts 4 are closed through the control circuit 31 (FIGS. 1 and 3), as will be explained. Then, at 32, the routine 22 waits, for example, a number of cycles (e.g., without limitation, about ten line cycles) before measuring $V_s$ 33, the line voltage during starting, and $I_s$ 34, the line current during starting. Next, at 36, the routine 22 calculates the available short circuit current, $I_{sc}$, using, for example, Equations 1 and 2.

At 38, the routine 22 determines if there is a fault (e.g., without limitation, fault 12; a motor fault; a power cable fault) and, if so, then, at 40, the fault current, $I_f$ 41, is measured using the current sensors 16. For example and without limitation, the value is an RMS value measured 4,000 times a second. The fault current value is calculated as an RMS value every half-cycle for use by the routine 22. Next, at 42, it is determined if the fault current, $I_f$ 41, is greater than the instantaneous trip setting, $I_{inst}$, of the contactor 2.

If not, then a conventional start overload trip algorithm is responsively executed at 44. Otherwise, if the fault current, $I_f$ 41, is greater than the instantaneous trip setting, $I_{inst}$, then the routine 22 waits for a corresponding start delay (if starting) or a corresponding run delay (if running), at 46.

Next, at 48, it is determined if the available short circuit current, $I_{sc}$, is greater than the interrupting rating, which is the contactor short-circuit breaking capacity, $I_k$. If not, then at 50, the contactor opening time is set to be as fast as possible and the separable contacts 4 are responsively opened. On the other hand, if the available short circuit current, $I_{sc}$, is greater than the contactor short-circuit breaking capacity, $I_k$, then this delays the opening of the contactor separable contacts 4 and execution resumes at 52. Because of arc voltage, the available short circuit current, $I_{sc}$, could be much higher than the fault current, $I_f$ 41 As a result, the test, at 52, is for the fault current, $I_f$ 41, being greater than the contactor short-circuit breaking capacity, $I_k$. If not, then the contactor is responsively opened, at 54, similar to 50. The routine 22 determines if the fault current, $I_f$ 41, flowing through the separable contacts 4 is less than the short-circuit breaking capacity, $I_k$, and responsively opens the separable contacts 4.

Otherwise, if the fault current, $I_f$ 41, is greater than the contactor short-circuit breaking capacity, $I_k$, then, at 56, the contactor separable contacts 4 are kept closed and are set to open after the fault current has been interrupted by another circuit interrupter, such as, for example, the power fuses 14.

Next, at 58, it is determined if the fault current, $I_f$ 41, is equal to zero. If not, then at 60, the contactor separable contacts 4 are kept closed, and step 58 is repeated. On the other hand, if the fault current, $I_f$ 41, is zero, then the contactor separable contacts 4 are opened at 62.

During starting or running, at 38, the routine 22 periodically senses the motor current using the current sensors 16 and recognizes a sudden increase in current and trips (e.g., an instantaneous trip at 50, 54 or 62; an overload or thermal trip at 44). As a result, during fault conditions, for an instantaneous trip, the contactor 2 is opened rapidly at 50 or 54 for currents below the contactor interrupting rating, thereby reducing fatigue of the example power fuses 14 and minimizing damage to downstream components, such as power cables or the example motor 24.

The instantaneous trip function starts at 46 and has two delays (a start delay and a run delay) that prevent nuisance tripping. The start delay prevents tripping due to, for example and without limitation, power factor correction capacitor charging currents. The run delay prevents tripping on line surges.

At steps 40,42,44, the routine 22 determines if the fault current flowing through the separable contacts 4 is less than the instantaneous trip setting and responsively executes the overload trip algorithm at 44. Otherwise, at steps 46,48,52, 56,58,60,62, the routine 22 delays opening the separable contacts 4 until the fault current is zero if: (a) the fault current flowing through the separable contacts 4 is greater than the contactor instantaneous trip setting, (b) the available short circuit current, $I_{sc}$, is greater than the contactor interrupting rating, and (c) the fault current flowing through the separable contacts 4 is greater than the contactor interrupting rating.

After an instantaneous trip is determined, at 40 and 42, the routine 22 either responsively opens the contactor 2 at 50 or 54, or delays opening the contactor 2 until the example power fuses 14 have cleared the fault. If the routine 22 delays tripping, then it continues to monitor the line current at steps 60 and 58.

Example 3

FIG. 2 shows, for example, three-phase voltages 29,33 and three-phase currents 34,41, with single-phase calculations at 36 (Equations 1 and 2). Here, the three-phase voltages 29 or 33, and the three-phase currents 34 or 41, are each preferably averaged for these calculations.

Typically, the three-phase currents are balanced within about 2% to 3%. When a fault occurs (e.g., as tested at step 52), it can be a single-phase line-to-ground (LG), a single-phase line-to-line (LL), or a three-phase line-to-line (LLL) and/or a line-to-line and ground (LLLG). For example and without limitation, the incoming power can have four fault ratings LLL=6171 A, LLG=5580 A, LL=5344 A, and LG=4110 A. This reflects, for example, the different impedances based on spacing of the power system cables. All of these numbers are on a symmetrical basis (e.g., after about 10 cycles of fault, all of the asymmetrical components have settled out). Since all three currents are employed, the calculated fault current is LLL, which is the worst case. A bolted fault is one that has the power conductors bolted together and perhaps to ground depending upon the test. After arcing starts, there is an arc voltage involved and this depends on the length of the arc. In motor starters, this is typically about 400 volts to about 700 volts or about 10% to about 20% of the rated voltage. This results in the calculated fault current being higher than the actual fault current.

Example 4

When the contactor separable contacts 4 close and the motor 24 starts to turn, the current is about 450% to about 700% of the full load current. As the motor 24 accelerates, the current drops to the full load current at rated speed. This time span is called the starting mode, and a suitable predetermined start delay (e.g., without limitation, about 30 mS; any suitable time) is assigned during this time. The routine 22 uses the predetermined start delay to prevent nuisance tripping due to disturbances that are not harmful to the motor 24. When there is a high current above the level assigned to trip, $I_{inst}$, the start delay holds off declaring a trip for the assigned time delay and verifies whether the condition has cleared. If the condition has cleared, then the trip is not declared. Otherwise, if the condition has not cleared, then a trip is declared and the routine 22 moves to the next step.

After the motor 24 is at speed and the current drops to the full load current at rated speed, the motor 24 is declared to be running and, thus, a suitable predetermined run delay (e.g., without limitation, about 20 mS; any suitable time) applies during this time. The run delay is a setting assigned to ignore disturbances that are not harmful to the motor 24 that occur during the running mode of the motor (i.e., after it has reached full speed and the current flowing through the separable contacts 4 has settled below the motor full load level). The disturbances can be caused, for example, by another motor starting, switching capacitors, momentary voltage dips or loss of the power system.

Example 5

$I_s$ 34 is the starting current of the motor 24 (e.g., the locked rotor current). This is the current flowing in the system as the motor 24 starts to accelerate and is, for example and without limitation, about 450% to about 700% of the full load current. Although a typical range is provided, the starting current may be any suitable smaller or larger percentage of the full load current.

$I_{sc}$ (Equation 2) is the bolted short circuit current of the system. This current is typically about 15 to about 20 times $I_s$ 34.

$I_f$ 41 is the actual fault current flowing in the system. This current includes the effects of arc voltages and is typically about 80% of $I_{sc}$ depending on spacings and impedances of the system that are not in effect during starting.

With a motor power circuit (e.g., as shown in FIG. 1), the three-wire single-phase values apply to three-phase circuits. The contactor separable contacts 4 (e.g., without limitation, vacuum interrupters) are rated single-phase and are tested at full line-to-line voltage and contactor short-circuit breaking capacity current. The power fuses 14 are also rated in this manner.

Example 6

A motor fault is when the fault occurs in the motor 24, the motor leads to ground, or the three-phase windings phase-to-phase or phase-to-ground. A cable fault occurs in the power cables leading to the motor 24, either phase-to-phase or phase-to-ground.

Example 7

In FIG. 2, after an instantaneous trip is determined at 40 and 42, the routine 22 either responsively opens the contactor separable contacts 4 ($I_{sc}<I_k$ at 48, or $I_f<I_k$ at 52), or else delays opening until a number of the example power fuses 14 have cleared the fault (e.g., $I_f=0$), after which it opens the separable contacts 4 at 62. Hence, the final check for $I_f=0$ is repeated, at 60 and 58, if the contactor separable contacts 4 are kept closed.

Example 8

At 44 of FIG. 2, any suitable overload trip algorithm can be employed. As a non-limiting example, when the motor current exceeds a preset level (pickup), a suitable timing sequence is started that will, if the current does not decrease below the pickup level, cause a trip. One example is filling a thermal bucket. A relatively small stream (i.e., a relatively small overload current) takes a relatively longer time, while a relatively large stream (i.e., a relatively large overload current) takes a relatively shorter time.

Example 9

In FIG. 2, there are three example tests at 42,48,52 for one value being greater than (>) another value. Here, if floating point calculations are employed by the processor 10, then a test being equal (=) either will not or is highly unlikely to occur. Alternatively, a greater than or equal ($\geq$) test can be performed, such that if the test result is greater than (>) or equal to (=), then the separable contacts 4 are kept closed.

It will be appreciated that the test, at 58, for one value being equal to zero can be for such value being approximately equal to zero, for example, in order to account for noise and/or for the resolution or accuracy of the current sensors 16.

Example 10

Figure 3:
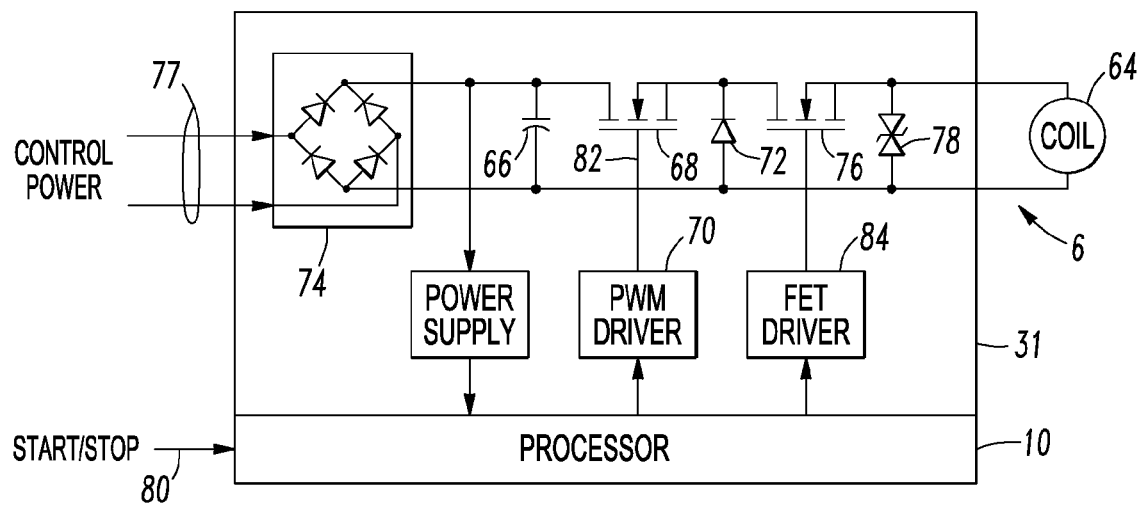
FIG. 3 is a block diagram in schematic form of the contactor coil control circuit of FIG. 1.

Referring to FIG. 3, the operating mechanism 6 includes the control circuit 31 and a coil 64. The processor 10 and the control circuit 31 preferably cause an immediate depletion of the back electromotive force (EMF) of the coil 64 to reduce the opening time of the separable contacts 4. This is useful in those cases (e.g., 52 and 54 of FIG. 2) where the fault current is less than the contactor interrupting rating.

The example control circuit 31 includes a capacitor 66, a switch, such as a field effect transistor (FET) 68, and a pulse width modulated (PWM) driver 70 for driving the FET 68. When the FET 68 is turned on by the PWM driver 70, a diode 72 is reverse biased and does not conduct. On the other hand, when the FET 68 is turned off by the PWM driver 70, the back EMF of the coil 64 causes the diode 72 to be forward biased and conduct a circulating current through the coil 64 until the FET 68 starts to conduct again. This circulating current keeps the separable contacts 4 closed until the FET 68 starts to conduct again.

The example control circuit 31 also includes a suitable charging circuit, such as the example full-wave bridge 74, to charge the capacitor 66 from a control voltage 77 with sufficient energy to hold the separable contacts 4 closed and to keep the processor 10 operational for at least a predetermined time after loss of the control voltage 77. The PWM driver 70, after energizing the coil 64 for a predetermined time, reduces the voltage to the coil 64 to a predetermined voltage, which holds the separable contacts 4 closed.

The control circuit 31 also includes a second switch, such as the example FET 76, which is electrically connected in series with the first FET 68, and a transorb 78 electrically connected in parallel with the coil 64. The processor 10 opens the separable contacts 4 by causing the second FET 76 to turn off. The turning off of FET 76 causes the back EMF of the coil 64 to be conducted through the transorb 78 at a predetermined voltage, which causes the separable contacts 4 to open after a predetermined time.

The example control voltage 77 can be, for example and without limitation, 120 VAC, 125 VDC or 240 VAC. For example, this voltage 77 preferably charges the capacitor 66 with sufficient energy to hold the contactor 2 closed and keep the processor 4 operational for about 300 milliseconds after the loss of the control voltage 77.

When the processor 10 receives a start command 80, it causes the PWM driver 70 to turn on the FET 68 with a PWM signal 82. The processor 10 also causes an FET driver 84 to turn on the second FET 76. A non-limiting example rate of the PWM signal 82 is about 1000 Hz.

Example 11

For example, after about 200 milliseconds, the first FET 68 driven by the PWM driver 70 reduces the voltage to the coil 64 to about 10 volts. This is sufficient voltage to hold the contactor 2 closed during operation and allows the coil 64 to have only about a 6° C. temperature rise. For example, if the control voltage 77 drops to less than about 70 volts, then the contactor 2 may not pickup. Also, if the control voltage 77 drops below about 45 volts, then the contactor 2 drops out after a relatively long time.

Example 12

When the processor 10 wants the contactor 2 to drop out, it causes the FET driver 84 to turn off the second FET 76. The back EMF of the coil 64 forces the transorb 78 (or a suitable transient voltage suppression diode) to start conducting at about 150 volts. The energy absorbed by the transorb 78 causes the contactor 2 to drop out in a suitable predictable time.

Example 13

When a fault occurs, known contactors remain closed and wait a suitable sufficient time for a circuit interrupter, such as a power fuse, to clear the fault. However, many applications of contactors have short circuit currents that the contactor could clear with relative ease.

The disclosed concept calculates the short circuit current capability (the available short circuit current, $I_{sc}$) and determines if the contactor 2 should interrupt the fault 12 or stay closed and allow the power fuse 14 to clear the fault. This has two advantages. First, the power fuse 14 does not necessarily have to be replaced (e.g., without limitation, at about $1,000 for each fault). Second, because it takes the power fuse 14 a relatively long time to clear a relatively low level fault, the potential damage to the load, such as the example motor 24, and/or the power cables is much less with the disclosed contactor 2 and, as a result, repair costs will be less.

Example 14

The disclosed contactor 2 can be, for example and without limitation, a contactor having a number of poles, a medium voltage motor starter, or a three-pole medium voltage contactor, such as a motor starter. For example, in motor starting, the load changes are measurable and relatively dramatic.

Alternatively, the disclosed concept can be used in a distribution switchgear device. In distribution switchgear applications, the load changes are not as dramatic, thereby making the available short circuit current, $I_{sc}$, calculation relatively less reliable.

Example 15

A method of operating an electrical switching apparatus, such as the example contactor 2, includes employing a number of separable contacts, such as 4, sensing current, $I_s$ or $I_f$, flowing through the separable contacts 4, determining a fault 12 from the sensed current flowing through the separable contacts 4, determining if the sensed current associated with the fault 12 is less than an interrupting rating of the contactor 2 and responsively opening the separable contacts 4, and determining if the sensed current associated with the fault 12 is greater than the interrupting rating and responsively keeping the separable contacts 4 closed and waiting for another circuit interrupter, such as the example power fuses 14, to interrupt the fault 12.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electrical switching apparatus including an interrupting rating, said electrical switching apparatus comprising:
   a number of separable contacts;
   an operating mechanism structured to open and close said separable contacts;
   a number of sensors structured to sense at least current flowing through said separable contacts; and
   a processor structured to cooperate with said operating mechanism to open and close said separable contacts, and to determine a fault from said sensed current flowing through said separable contacts,
   wherein said processor is further structured to responsively open said separable contacts if the sensed current associated with said fault is less than said interrupting rating, and
   wherein said processor is further structured to keep said separable contacts closed and wait for another circuit interrupter to interrupt said fault if the sensed current associated with said fault is greater than said interrupting rating.

2. The electrical switching apparatus of claim 1 wherein said electrical switching apparatus is a three-pole medium voltage contactor.

3. The electrical switching apparatus of claim 1 wherein said electrical switching apparatus is contactor having a number of poles.

4. The electrical switching apparatus of claim 1 wherein said operating mechanism comprises a control circuit and a coil; and wherein said processor and said control circuit are structured to cause an immediate depletion of the back electromotive force of said coil to reduce opening time of said separable contacts.

5. The electrical switching apparatus of claim 1 wherein said number of sensors are a number of voltage sensors structured to sense voltage operatively associated with said separable contacts and a number of current sensors structured to sense said current flowing through said separable contacts; wherein said electrical switching apparatus is a motor starter for a motor; and wherein said processor is further structured, when starting said motor, to input from said current sensors and said voltage sensors line voltage and line current for a number of line cycles during said starting.

6. The electrical switching apparatus of claim 5 wherein said processor is further structured to calculate:

$$V_d = (V_b - V_s)/V_b, \text{ and}$$

$$I_{sc} = I_s/V_d;$$

wherein $V_d$ is per unit voltage drop, $V_b$ is the line voltage before said starting, $V_s$ is the line voltage during said starting, $I_{sc}$ is available short circuit current, and $I_s$ is the line current during said starting.

7. The electrical switching apparatus of claim 6 wherein said processor is further structured to determine if the available short circuit current, $I_{sc}$, is less than said interrupting rating, which is a short-circuit breaking capacity of said electrical switching apparatus, and responsively open said separable contacts; and wherein said processor is further structured to delay opening said separable contacts if the available short circuit current, $I_{sc}$, is greater than the short-circuit breaking capacity.

8. The electrical switching apparatus of claim 7 wherein said processor is further structured to determine if the fault current flowing through said separable contacts is less than the short-circuit breaking capacity and responsively open said separable contacts.

9. The electrical switching apparatus of claim 7 wherein said processor is further structured to open said separable contacts after the fault current has been interrupted by said another circuit interrupter if the available short circuit current, $I_{sc}$, is greater than the short-circuit breaking capacity.

10. The electrical switching apparatus of claim 5 wherein said processor is further structured to determine if a fault current flowing through said separable contacts is less than an instantaneous trip setting and responsively execute an overload trip algorithm; and wherein said processor is further structured to wait for one of a predetermined start delay or a predetermined run delay if the fault current flowing through said separable contacts is greater than the instantaneous trip setting.

11. The electrical switching apparatus of claim 10 wherein said processor is further structured to use said predetermined start delay after said motor has been started and the line current is about 450% to about 700% of a full load current until the line current drops to said full load current.

12. The electrical switching apparatus of claim 6 wherein said processor is further structured to determine if a fault current flowing through said separable contacts is less than an instantaneous trip setting and responsively execute an overload trip algorithm; and wherein said processor is further structured to delay opening said separable contacts until the fault current is zero if: the fault current flowing through said separable contacts is greater than the instantaneous trip setting, the available short circuit current, $I_{sc}$, is greater than said interrupting rating, and the fault current flowing through said separable contacts is greater than said interrupting rating.

13. The electrical switching apparatus of claim 1 wherein said operating mechanism comprises a coil and a control circuit for driving said coil; wherein said control circuit comprises a capacitor, a switch and a pulse width modulated driver for driving said switch; wherein when said switch is turned on by said pulse width modulated driver, said diode is reverse biased and does not conduct; wherein when said switch is turned off by said pulse width modulated driver, the back electromotive force of said coil causes said diode to be forward biased and conduct a circulating current through said coil until said switch starts to conduct again; and wherein said circulating current keeps said separable contacts closed until said switch starts to conduct again.

14. The electrical switching apparatus of claim 13 wherein said control circuit further comprises a charging circuit structured to charge said capacitor from a control voltage with sufficient energy to hold said separable contacts closed and to keep said processor operational for at least a predetermined time after loss of said control voltage.

15. The electrical switching apparatus of claim 13 wherein said pulse width modulated driver is structured, after energizing said coil for a predetermined time, to reduce the voltage to said coil to a predetermined voltage and hold said separable contacts closed.

16. The electrical switching apparatus of claim 13 wherein said switch is a first switch; wherein said control circuit further comprises a second switch electrically connected in series with said first switch and a transorb electrically connected in parallel with said coil; and wherein said processor is further structured to open said separable contacts by causing said second switch to turn off, in order that the back electromotive force of said coil causes said transorb to start conducting at a predetermined voltage, which causes said separable contacts to open after a predetermined time.

17. The electrical switching apparatus of claim 1 wherein said number of sensors are a number of voltage sensors structured to sense voltage operatively associated with said separable contacts and a number of current sensors structured to sense said current flowing through said separable contacts; wherein said processor is further structured to input from said current sensors and said voltage sensors line voltage and line current, calculate therefrom available short circuit current and determine if said electrical switching apparatus should open said separable contacts to interrupt a fault or allow said another circuit interrupter to interrupt said fault.

18. The electrical switching apparatus of claim 1 wherein said electrical switching apparatus is a medium voltage motor starter.

19. The electrical switching apparatus of claim 1 wherein said electrical switching apparatus is a distribution switchgear device.

20. A method of operating an electrical switching apparatus including an interrupting rating, said method comprising:
employing a number of separable contacts;
sensing current flowing through said separable contacts;
determining a fault from said sensed current flowing through said separable contacts;
determining if the sensed current associated with said fault is less than said interrupting rating, and responsively opening said separable contacts; and
determining if the sensed current associated with said fault is greater than said interrupting rating, and responsively keeping said separable contacts closed and waiting for another circuit interrupter to interrupt said fault.

21. The method of claim 20 further comprising
sensing voltage operatively associated with said separable contacts;
determining an available short circuit current from said sensed voltage and said sensed current;
determining if the available short circuit current is less than said interrupting rating, which is a short-circuit breaking capacity of said electrical switching apparatus, and responsively opening said separable contacts; and
determining if the available short circuit current is greater than the short-circuit breaking capacity and delaying opening said separable contacts.

22. The method of claim 21 further comprising
determining if a fault current flowing through said separable contacts is less than the short-circuit breaking capacity and responsively opening said separable contacts.

23. A contactor including an interrupting rating, said contactor comprising:
a number of separable contacts;
an operating mechanism structured to open and close said separable contacts;
a number of current sensors structured to sense current flowing through said separable contacts;
a number of voltage sensors structured to sense voltage operatively associated with said separable contacts; and
a processor structured to cooperate with said operating mechanism to open and close said separable contacts, and to determine a fault from said sensed current flowing through said separable contacts,
wherein said processor is further structured, before starting a load, to input from said voltage sensors line voltage, $V_b$, before said starting,
wherein said processor is further structured, after starting said load, to input from said voltage sensors and said current sensors line voltage, $V_s$, and line current, $I_s$, respectively, for a number of line cycles during said starting,
wherein said processor is further structured to calculate:

$V_d=(V_b-V_s)/V_b$, and $I_{sc}=I_s/V_d$;

wherein $V_d$ is per unit voltage drop, and $I_{sc}$ is available short circuit current,
wherein said processor is further structured to determine if the available short circuit current, $I_{sc}$, is less than said interrupting rating and responsively open said separable contacts, and
wherein said processor is further structured to delay opening said separable contacts and wait for another circuit interrupter to interrupt said fault if the available short circuit current, $I_{sc}$, is greater than said interrupting rating.

* * * * *